March 20, 1951     J. P. POMPA     2,545,897
TORTILLA FRYER FOR TOSTADAS
Filed March 1, 1950
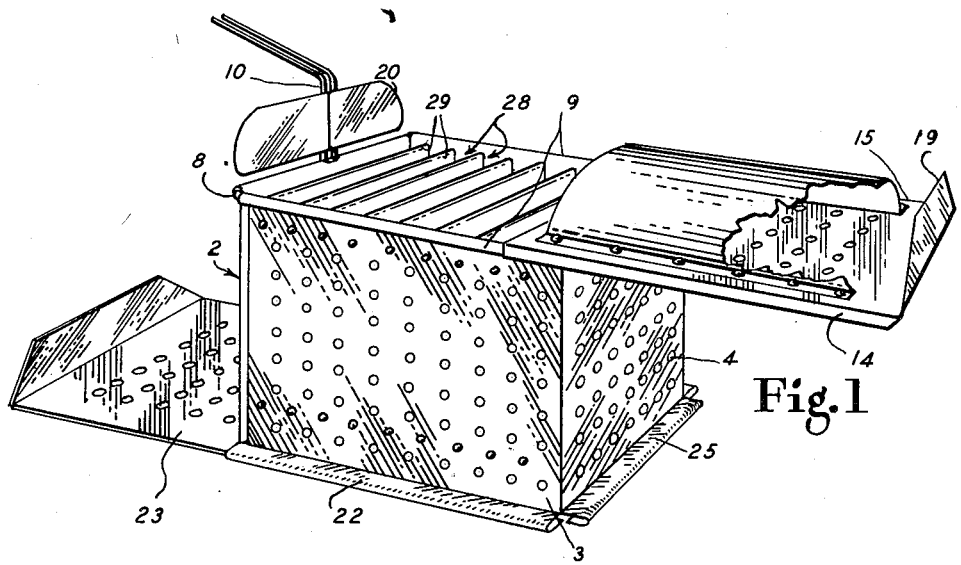
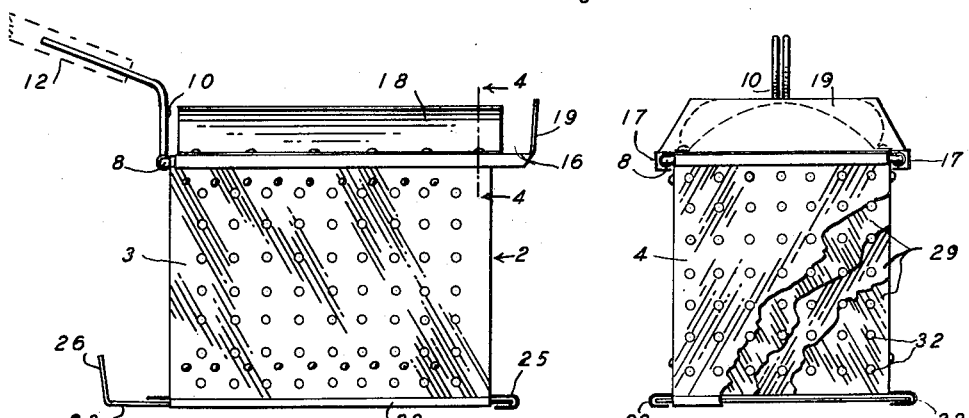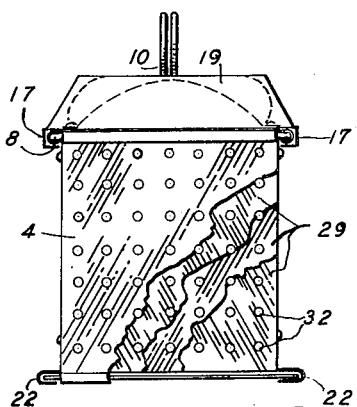
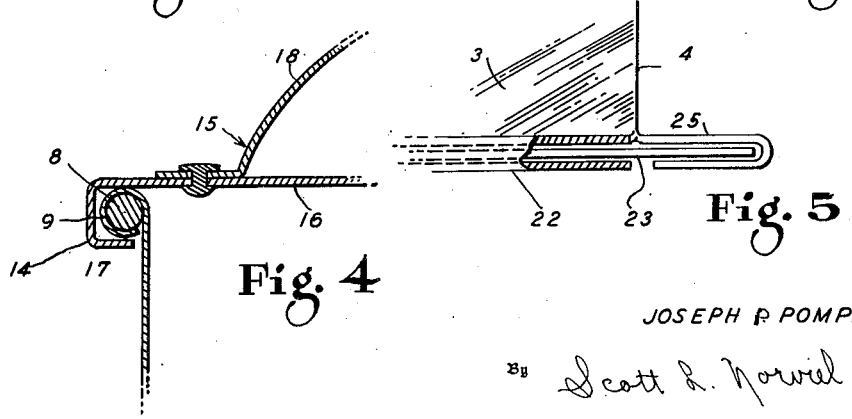
Inventor
JOSEPH P. POMPA
By Scott L. Norvell
Attorney Patented Mar. 20, 1951

2,545,897

UNITED STATES PATENT OFFICE 2,545,897

TORTILLA FRYER FOR TOSTADAS

Joseph P. Pompa, Glendale, Ariz.

Application March 1, 1950, Serial No. 147,107

2 Claims. (Cl. 99—416)

This invention relates to tortilla fryers for tostadas.

As commonly known to the art, a tostado is a food delicacy served extensively in the southwestern portion of the United States, composed of a rigid base, which is a crisply fried tortilla, on top of which various foods, such as refried frijoles, cheese, grated cabbage, etc., are placed, and seasoned with selected condiments.

This food probably takes its name from the fact that the bottom portion is always a toasted or crisp tortilla. Primarily, tortillas are baked from flour or cornmeal dough and are limp and soft, in order to form these into a rigid food that will support the other foods of this particular delicacy, it is necessary to cook them crisp so that they are quite rigid. Heretofore this crisping and frying has been done by placing the limp tortilla on the surface of melted deep frying fat and tending it with a fork, while it floats upon the fat, until it is cooked crisp and "sets" in a flat condition.

When a limp tortilla is placed on the surface of deep melted fat, it immediately starts to cook, and the water content issues in the form of steam. Some of this collects beneath the tortilla and forms upwardly rounded irregularities. As the cooking continues, the tortilla becomes crisp and it takes on a definite rigid "set" which is characterized by the shape it may be in at the time it reaches the crisping point. When frying by hand, as has heretofore been done, it is practically impossible to provide a smooth flat surface on the crisped tortilla. It is highly desirable that the crisped tortilla, which forms the base of the tostado, be as smooth and uniform as possible.

In view of this, one of the objects in the present device is to provide a device for rapidly frying and crisping tortillas so that they have a uniform shape and flat surfaces.

Another object is to provide a device for rapidly frying stacks of tortillas, held on edge so that deep fat will circulate swiftly over them to form flat, crisp tostado bases, eliminating the laborious method of floating and tending them on melted cooking fat.

Another object is to provide a device for deep-frying tortillas, as above stated, into which the tortillas may be easily packed, and from which the crisp tortillas may be easily removed;

Still another object is to provide such a device with means of shielding the user from being burned by hot grease or steam in the process of the cooking.

Other objects will appear hereinafter.

I attain the foregoing objects by means of the device shown in the accompanying drawing, in which—

Figure 1 is a perspective view of the entire assembled device, with the top and bottom closures slid to open position;

Figure 2 is a side view of the device with the top and bottom closed.

Figure 3 is an end view thereof with portions of the case broken away to show interior construction;

Figure 4 is a detailed view drawn on an enlarged scale and taken on line 4—4 of Figure 2; and Figure 5 is a view drawn on an enlarged scale showing the top slide details.

Similar numerals refer to similar parts in the several views.

This tortilla deep fat fryer has a body 2, which is composed of sheet aluminum plates. The construction includes perforated side plates 3 and end plates 4. The upper edges of side and end plates are rolled over a metal rod 8 forming beads 9. Rod 8 extends around the top of body 2 and has its ends brought together at 10 where they extend parallel in an upward direction and then angularly upward and away from the fryer body. The end portions are inserted in a wooden handle 12 of suitable lengths for holding the device for the purpose for which it is intended.

A top 15 has edges 14 shaped to fit and slide over the top side beads 9 above mentioned. This top includes a flat aluminum plate 16, the edges of which are bent downward and inward to form slides 17. An arched and upwardly curved hood 18 is attached to the top plate and forms a grease deflector. An upwardly extending flange 19 is formed on the outer end of the top plate to act as a handle by which it can be slid on and off body 2. A handle grease deflector 20 is formed by a vertical plate attached to the upwardly extending portion 10 of rod 8. This prevents any grease, not caught by the hood, from being thrown in the direction of the user grasping handle 12.

The bottom edges of the sides of body 2 are bent outward and then inward, forming bottom plate guide channels 22 in which the edges of bottom plate 23 slide. This bottom plate is perforated sheet aluminum and has its inner end 26 bent upward to form a handle. The bottom of end plate 4, opposite the handle end is bent to form a stop 25.

Within the body 2 are plurality of compartments 28 formed by uniformly spaced partition plates 29. These baffles are positioned by tabs at each end and are held in position by rivets 31. Each plate is perforated as at 32 in the same manner as the body sides and ends.

Perforations in all plates are approximately 3/8" in diameter and spaced uniformly about one inch apart in vertical and horizontal rows. These are necessary in order that the hot melted fat will flow freely to all parts.

The compartments 28, which are sized to receive limp tortillas, are about 3/4 inch wide and are sized to hold five tortillas set on edge.

In use, the slide bottom 23 is closed, and compartments 28 are filled with limp tortillas. In the preferred form, the device will hold about one hundred tortillas. Each compartment holds approximately five, and they are held in each compartment so as to be maintained in a flat condition, but with sufficient space between them, to admit the flow of hot melted fat.

After the compartments are filled, the top 16 is slid to closed position as shown in Figure 2, and the entire loaded device immersed in a container in which melted cooking fat has been raised to a comparatively high temperature. Circulation of the fat through the device commences immediately, and large amounts of steam are driven off through the holes in the sides, ends and top of the body 2. Steam does not form in pockets in the tortillas, so as to deform their shape, because, since they are placed on edge in each of the compartments 28, the steam escapes upward from between the packed tortillas as fast as it is formed.

The grease used must have sufficient heat content to quickly reach all parts of the device, and its rather large load, without dropping below the proper cooking temperature.

After the production of steam ceases, the tortillas quickly crisp, and since they are held flat against one another, and against the confining sides of the compartments, they crisp in a flat condition.

When the tortillas are crisped, the device is raised above the deep fat and allowed to drain for a few minutes. It is then placed over a receptacle to receive the tortillas, and the bottom plate slid off as indicated by the dotted line in Figure 1.

By using this device I am able to crisp fry one hundred, or more, tortillas in the time heretofore necessary for frying five, when tended by hand. Furthermore, the tortillas are completely flat and are evenly and uniformly fried.

I claim:

1. A tortilla deep fat fryer for crisping tortillas to form flat food bases, comprising in combination, a rectangular body having perforated sides and ends, a perforated slide opening bottom, a plurality of perforated transverse partitions within said body providing a plurality of shallow compartments adapted to hold a stack of tortillas edgewise therein, a slidable plate forming a top, a hood on said top forming a grease guard, and an upwardly extending handle attached to the top portion of said body.

2. A tortilla fryer for submerging tortillas edgewise and vertically in melted frying fat to form flat crisp food bases for tostadas, comprising in combination, a rectangular case having an open top and bottom and perforated side walls; a plurality of narrow rectangular compartments adapted to hold tortillas vertically edgewise in melted frying fat, formed therein by perforated plates; an outward roll formed along the top edges of said case side walls including a metal rod, portions of said rod extending outward and upward from said case edge to form a handle; a perforated top closing plate having lateral edges folded over to form guides to slidably engage opposite rolled top edges of said case and an upwardly extending hood forming a grease baffle; outwardly extending flanges having guide channels formed along opposite sides of the bottom edges of said case, and a perforated bottom closing plate having lateral edges adapted to slidably engage in the guide channels of said flanges.

JOSEPH P. POMPA.

REFERENCES CITED

The following references are of record in the file of this patent:

UNITED STATES PATENTS

| Number | Name | Date |
| --- | --- | --- |
| 831,476 | Ryan | Sept. 18, 1906 |
| 1,239,307 | Schmid | Sept. 4, 1917 |
| 2,472,582 | Green | June 7, 1949 |
| 2,506,305 | Maldonado | May 2, 1950 |